United States Patent [19]

Kaya et al.

[11] Patent Number: 4,507,930

[45] Date of Patent: Apr. 2, 1985

[54] COOLING TOWER MONITOR

[75] Inventors: Azmi Kaya, Akron; Alan C. Sommer, Mentor, both of Ohio

[73] Assignee: The Babcock & Wilcox Company, New Orleans, La.

[21] Appl. No.: 592,504

[22] Filed: Mar. 23, 1984

[51] Int. Cl.$^3$ .......................................... G01K 13/00
[52] U.S. Cl. ................................ 62/129; 165/11 R; 364/551
[58] Field of Search ............... 62/129, 125, 126, 127, 62/305, 176.4; 165/11 R; 261/DIG. 11; 364/550, 551; 374/40

[56] References Cited

U.S. PATENT DOCUMENTS

| | | | |
|---|---|---|---|
| 4,252,751 | 2/1981 | Shito | 261/DIG. 11 |
| 4,325,223 | 4/1982 | Cantley | 364/551 |
| 4,390,058 | 6/1983 | Otake et al. | 165/11 R |
| 4,474,027 | 10/1984 | Azmi et al. | 62/305 |

*Primary Examiner*—Harry Tanner
*Attorney, Agent, or Firm*—Vytas R. Matas; Robert J. Edwards

[57] ABSTRACT

A cooling tower monitor for determining the performance of a cooling tower includes temperature transmitters for determining the input water temperature, the output water temperature and the surrounding temperature of the tower. A flow transmitter measures the output flow of water and a speed transmitter determines the flow of air through the tower. A relative humidity transmitter is also utilized to measure the surrounding relative humidity. The transmitters are connected to function blocks to generate a value corresponding to the performance of the cooling tower as a function of the parameters measured. A first set of function blocks utilizes the surrounding temperature and relative humidity to calculate the wet bulb temperature of the air outside the tower. This measurement is utilized in conjunction with the input and output temperatures as well as the air flow value to calculate a nominal or available water flow rate for the tower. A standard condition tower unit and rating factor for the tower are utilized in this calculation. The available flow is then divided into the actual flow as determined by the water flow transmitter to obtain the performance value.

4 Claims, 8 Drawing Figures

COOLING TOWER MONITOR

FIELD AND BACKGROUND OF THE INVENTION

The present invention relates, in general, to performance measuring equipment for cooling towers and, in particular, to a new and useful cooling tower monitor which utilizes simple function blocks to monitor the performance of a cooling tower.

Cooling towers are steady-flow devices which are utilized to remove heat from water. Most industrial processes generate waste heat and this heat must be dissipated. Cooling towers use a combination of mass and energy transfer to cold water by exposing the water as an extended surface to the atmosphere. The water surface is extended by filling, which presents a film surface or creates drops due to splashing. The water may also be sprayed to produce droplets. An air flow is established past the water either in a cross-flow relationship or in a counter-flow relationship.

The *ASHRAE Equipment Handbook* of 1975 at chapter 21 describes cooling towers and methods of measuring their performance.

Performance calculations can be achieved only by computers with high level programming languages. The performance calculations cannot be performed by analog devices in an effective manner. "Chiller Plant Energy Conservation Operations" by K. Sinnamohideen and N. Olmstead, discloses the use of digital computers for calculating performance of a cooling tower. An article by K. Cooper of York division Borg-Warner Corp. entitled "Utilizing Water Chillers Efficiently" implies the performance of calculations to obtain a cooling tower performance value, but it is assumed that these calculations would also be performed utilizing a computer with high level programming language.

Currently, there are no effective tools for monitoring cooling tower performance except for computers. Computers however, require high level language which takes a relatively long period of time for processing and also requires highly trained personnel for its operation. This results in high cost.

SUMMARY OF THE INVENTION

The present invention is drawn to a monitor for monitoring the performance of a cooling tower which does not require a computer or its high level language. Simple function blocks are utilized which are assembled in a unique manner to achieve the performance calculation. This results in a low cost and high speed mechanism for monitoring cooling tower performance. Essentially, the advantages of analog devices and computers are combined according to the present invention.

Accordingly, an object of the present invention is to provide a cooling tower monitor which utilizes simple function blocks and a plurality of parameter transmitters to generate a performance value for the tower.

A further object of the invention is to provide such a monitor which includes temperature transmitters for transmitting signals corresponding to the cold water output temperature from the tower, the hot water input temperature of the tower and the surrounding temperature of the tower. A water flow transmitter and an air flow transmitter are provided for transmitting signals corresponding to the water flow in the output from the tower and the air flow through the tower. A relative humidity transmitter is also utilized to provide a signal corresponding to the relative humidity outside the tower. First, calculating means which are made up of discrete function blocks are connected to the outside temperature transmitter and to the relative humidity transmitter to calculate a wet bulb temperature as a function of the surrounding humidity and temperature. Second calculating means are connected to the other transmitters and also to the first calculating means for calculating available flow as a function of the rating factor for the tower as well as input and output temperatures and air flow, as a theoretical value. Further means are connected to the water flow transmitter and the second calculating means to generate the actual performance value which can be taken as a ratio between the actual flow and available or theoretical flow.

A still further object of the invention is to provide a cooling tower monitor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
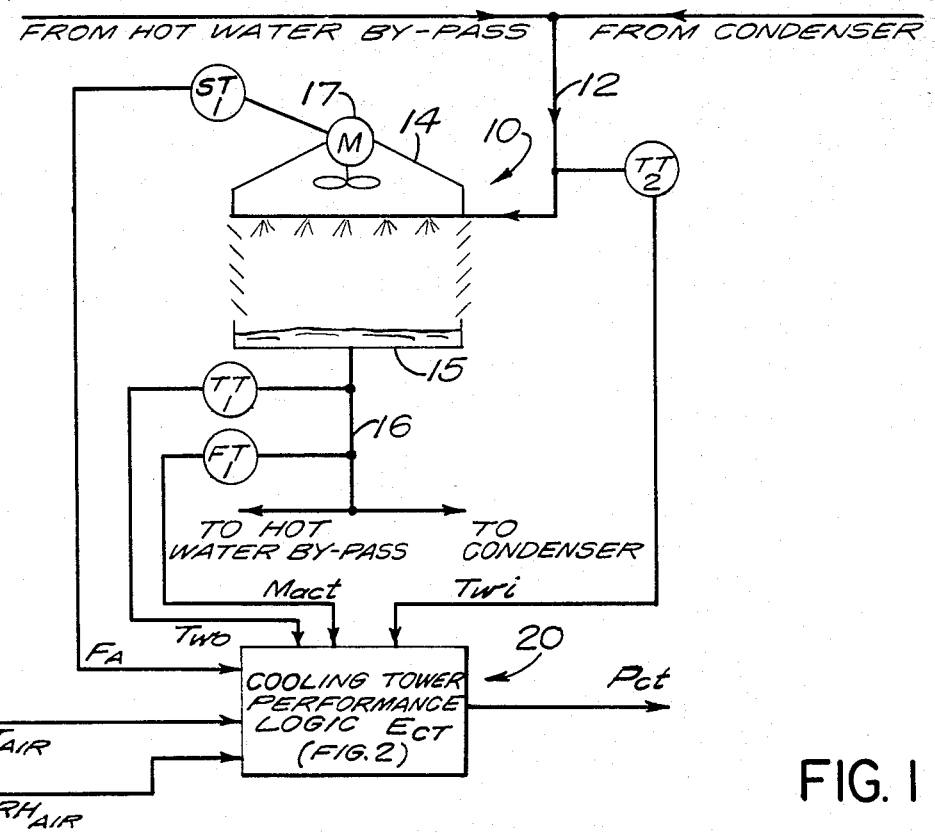
FIG. 1 is a schematic representation of a cooling tower with the parameter transmitters and modular performance calculator according to the invention.

Referring to the drawings, in particular, the invention embodied in FIG. 1 comprises a cooling tower monitor generally designated 20 for a cooling tower generally designated 10.

The cooling tower is provided with hot water on a hot-water inlet 12. As shown, hot water can be provided from a hot water by-pass or from a condenser of an industrial process or heat exchanger.

The water is sprayed down through a housing 14 of the heat exchanger and collected in a pan 15 from which it is supplied through a cold water outlet 16 back to the hot-water by-pass or condenser. A cross flow of air is established by a blower having a motor and fan and designated 17. A first temperature TT1 is connected to the cold water outlet 16 for transmitting a signal corresponding to the temperature of water leaving the cooling tower. A flow transmitter FT1 is connected to the outlet 16 for generating a value corresponding to the actual flow of water out of the tower. A second transmitter TT2 generates a signal corresponding to the input water temperature at 12. A third temperature transmitter TT3 generates a value corresponding to the surrounding or outside air temperature and a relative humidity transmitter RH1 generates a value corresponding to the surrounding relative humidity of the air outside the tower. Finally, a speed transmitter ST1 is connected to the motor and fan combination 17 and generates a signal ($F_A$) corresponding to the flow of air through the cooling tower.

The monitor 20 receives the signals from the transmitter and generates a value $P_{ct}$ corresponding to the performance of the cooling tower.

The purpose of the cooling tower monitor 20 is to determine the ability of the tower to provide its expected performance.

The equivalent area to cool a 1 gpm (gallon per minute) flow of water at standard conditions is called 1 tower unit. The standard conditions are:

$T_{wi}$ = Temperature of entering water = 90° F.;
$T_{wo}$ = Temperature of leaving water = 80° F.; and
$T_{ab}$ = Wet bulb temperature of air = 70° F.

If the cooling tower delivers M gpm water at standard conditions, then the tower has a rating of "M, tower unit". Industry uses the flow rate of water, M gpm, at standard conditions as the performance capability which is the same as the "tower unit".

Two other terms are used which are related to temperature:

$$A = \text{Approach} = T_{wo} - T_{ab} \quad (1)$$

$$R = \text{Range} = T_{wi} - T_{wo} \quad (2)$$

The standard conditions dictate that:

$$A° = 80 - 70 = 10 \quad (3)$$

$$R° = 90 - 80 = 10 \quad (4)$$

The performance of the cooling tower is measured at various temperature conditions, but rather at standard conditions. The correction is made by the "rating factor" (F), to find the performance at standard conditions. The Rating Factor is found from rating charts given by the *ASHRAE Equipment Handbook* at Chapter 21. Rating factor is presented as a function of Range and Approach, for a given wet bulb temperature of air.

ASHRAE charts are for a given air flow through the tower. In the development here, airflow is varied for optimization and will be taken as an independent variable. Then, $$RF = f(R, A, T_{ab}, F_a) \quad (a)$$

a nonlinear function can be written. Describing RF about a reference point $(RF)°$, in terms of functional variations, f, of each variable $$RF = (RF)°[f_R(R)][f_A(A)][f_T(T_{ab})][f_F(F_A)] \quad (6)$$

is written. Since $(RF)° = 1$, the values of $f_R$, $f_A$, $f_T$ can be taken from ASHRAE charts directly. These functional relations are plotted in FIGS. 4, 5 and 6. The values $f_F$ can be taken as:

$$f_F(F_A) = (F_A/F_A°)^{.9} \quad (7)$$

However, the manufacturer's data should be used if possible:

The Cooling Tower Performance Factor ($P_{ct}$) is similar to a fouling factor for a heat exchanger. The performance factor of the cooling tower is defined as:

$$P_{ct} = \left[\frac{\text{Actual Flow}}{\text{Available Flow}}\right]_{std} = \frac{M_{act}}{M_{ava}} \quad (8)$$

measured at standard conditions. The "RF" values are used to find $P_{ct}$. The procedure is as follows:

1. Measure $T_{ab}$, $T_{wo}$, $T_{wi}$, $F_A$ to get A and R;
2. Find $f_R$, $R_A$, $F_T$, $f_F$ to determine RF;
3. For known Tower Units or M° find $M_{ava}$ from:

$$M_{ava} = \frac{\text{Tower Units}}{RF} = \frac{M°}{RF}; \quad (9)$$

and

4. Measure $M_{act}$ and find $P_{ct}$ from equation (8).

Figure 2:
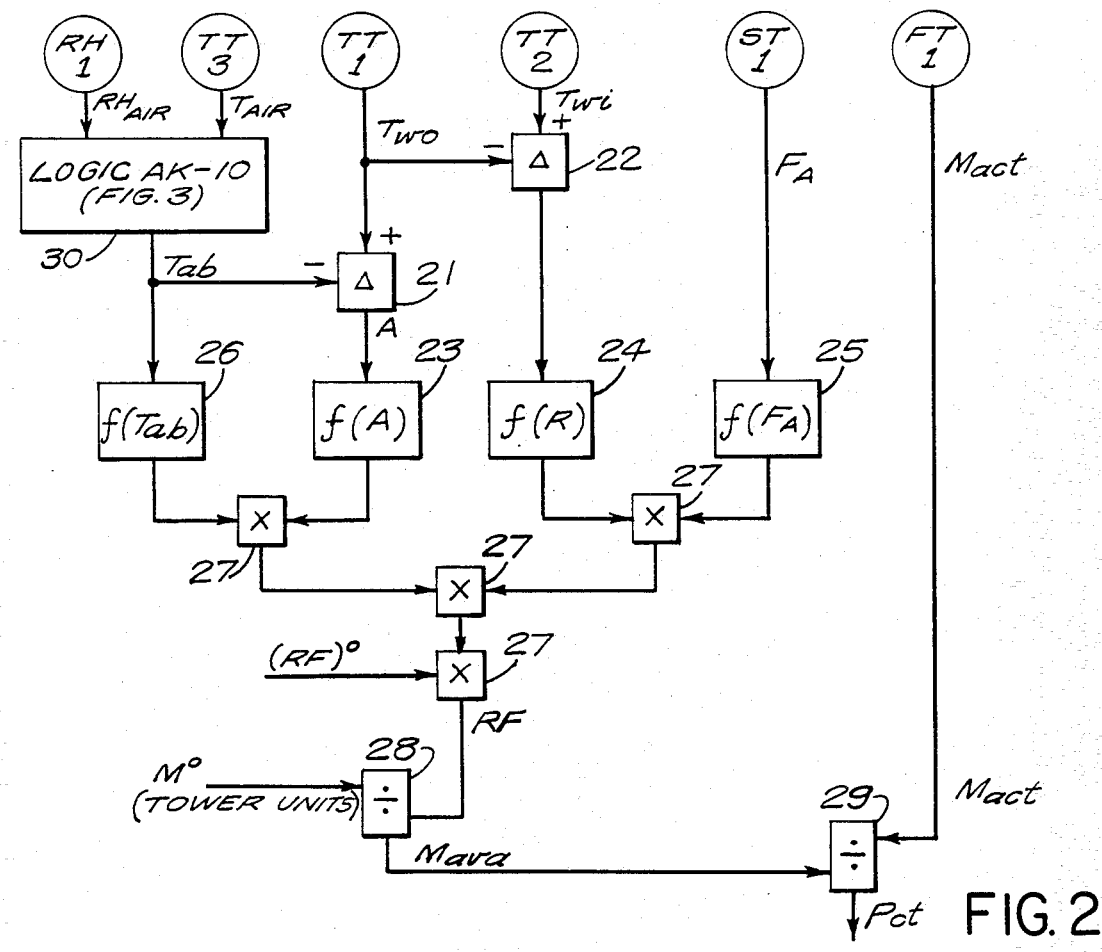
FIG. 2 is a block diagram showing the overall cooling tower monitor for monitoring the performance of the cooling tower.

Turning to FIG. 2, a logic block 30 is utilized to calculate the wet bulb temperature of air $T_{ab}$ as a function of the surrounding air temperature T and surrounding relative humidity RH as supplied by transmitters TT3 and RH1. Details of logic circuit 30 are shown in FIG. 3 and will be discussed later.

A first comparator 21 subtracts the wet bulb temperature from the output temperature which is supplied by temperature transmitter TT1 to obtain the value for approach A. A second comparator or subtraction unit 22 is connected between the first and second temperature transmitters TT1 and TT2 to generate the range R. The speed transmitter ST1 provides an air flow value directly to a function generator 25. The output of logic circuit 30, first comparator 21 and second comparator 22 are connected respectively to function generators 26, 23, and 24.

Figure 4:
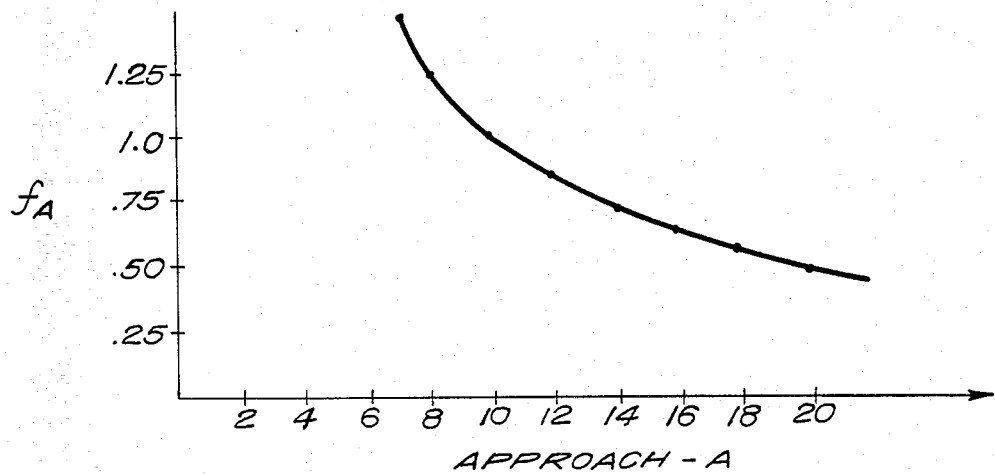
FIGS. 4 through 6 are graphs illustrating the quantities of approach, range and wet bulb temperature of air for the cooling tower.
Figure 5:
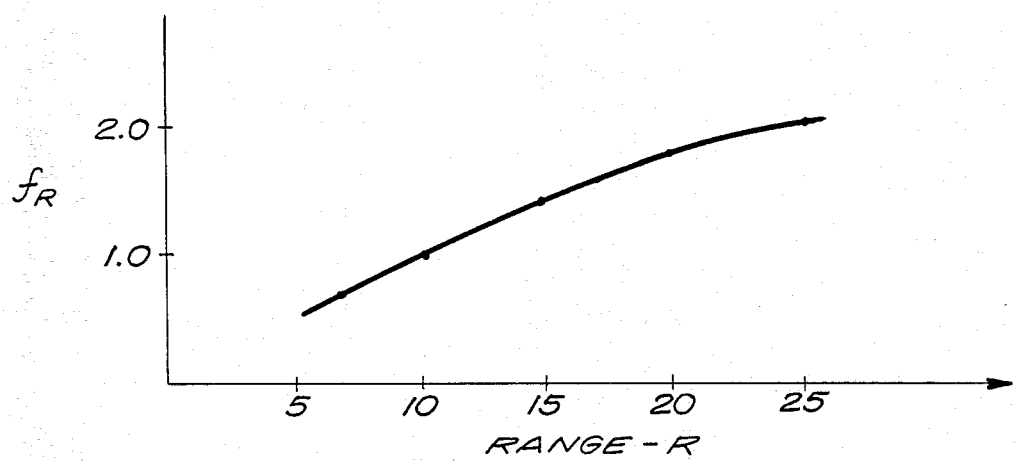
Figure 6:
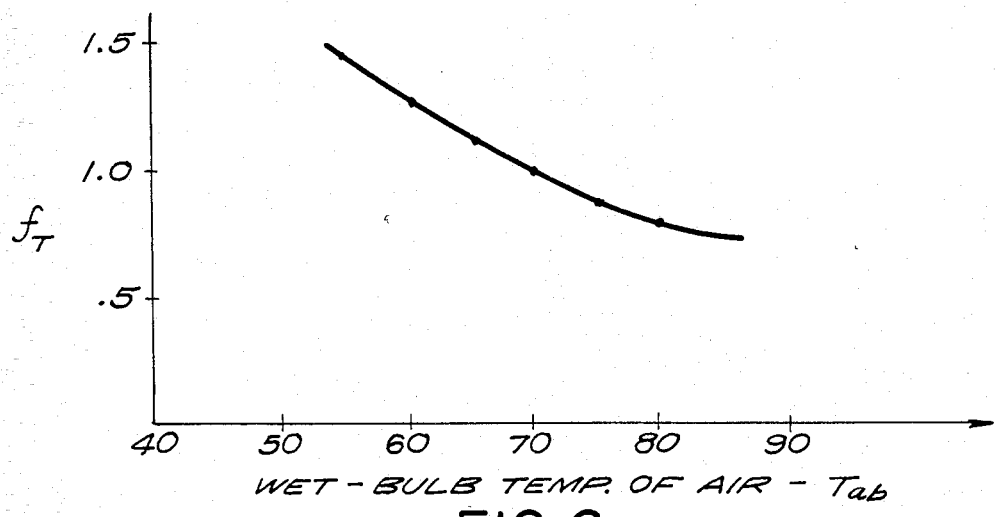

Function blocks 23, 24 and 26 generate functions illustrated in FIGS. 4, 5, and 6, respectively. Function block 25 performs the function calculation of equation (7). Multipliers 27 are connected to the outputs of function blocks 23 through 26 and also to a value line for providing the $(RF)°$ to generate the rating factor RF for the cooling tower. This value divides the tower units M° in divider 28 to obtain the available or theoretical flow value $M_{ava}$. This value is divided into the actual flow $M_{act}$ in a further divider 29 to obtain the performance value $P_{ct}$.

Figure 3:
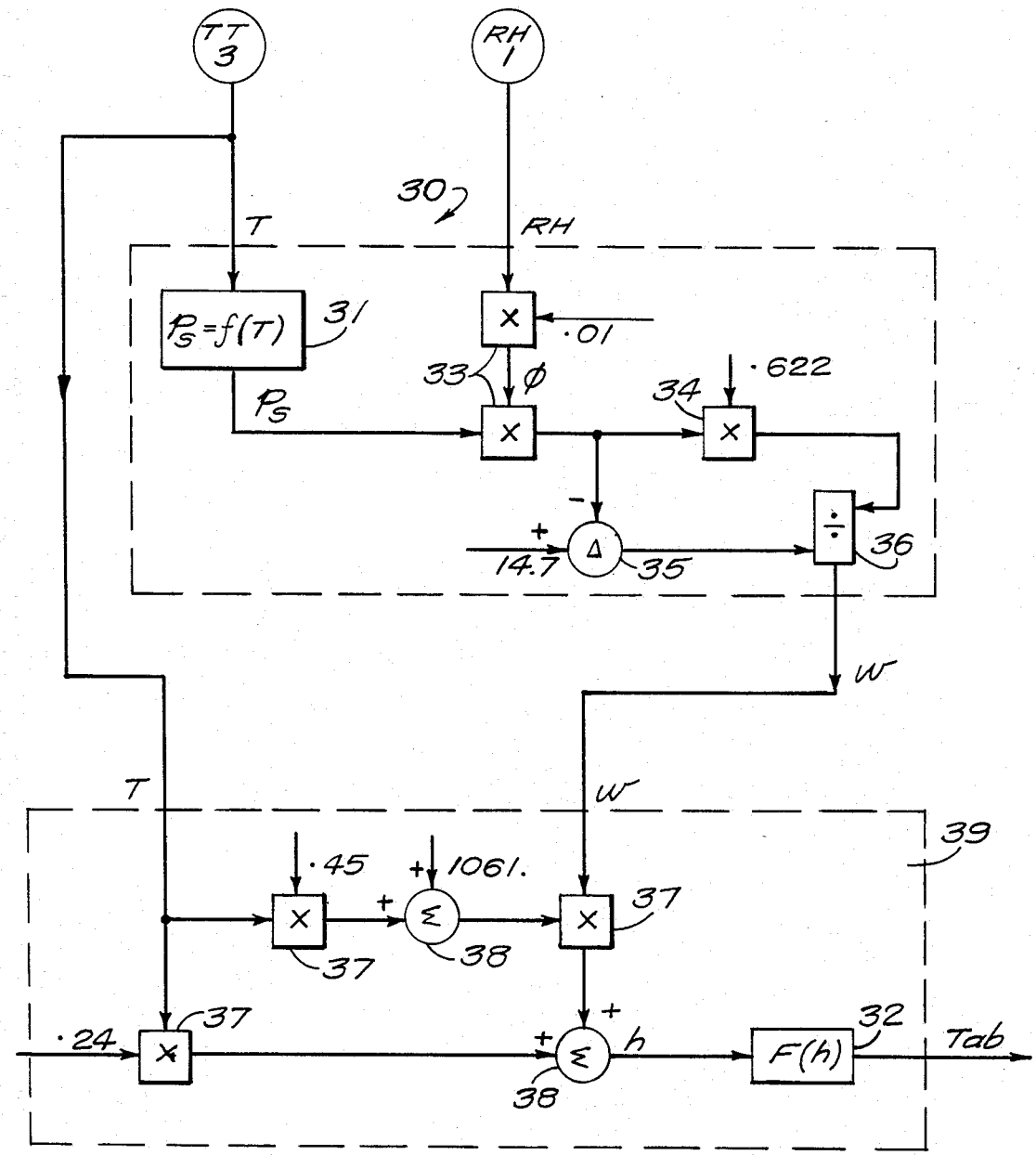
FIG. 3 is a block diagram showing the logic circuit for generating a wet bulb temperature for use in calculating a theoretical or available water flow through the cooling tower.
Figure 7:
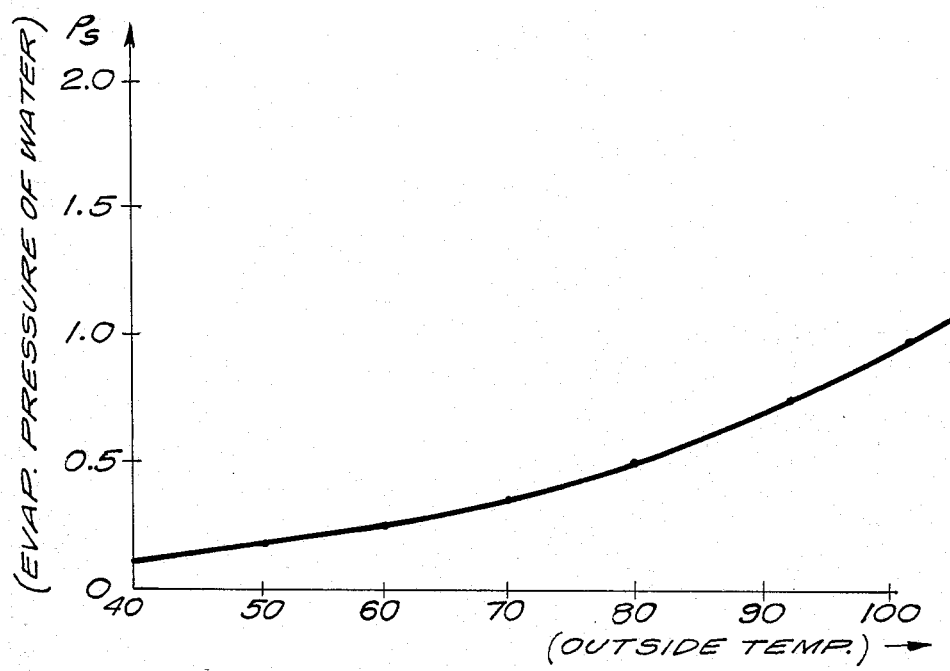
FIGS. 7 and 8 are graphs showing the relationship of outside temperature to evaporation pressure of water and enthalpy or energy content to wet bulb temperature for use in the block diagram of FIG. 3.
Figure 8:
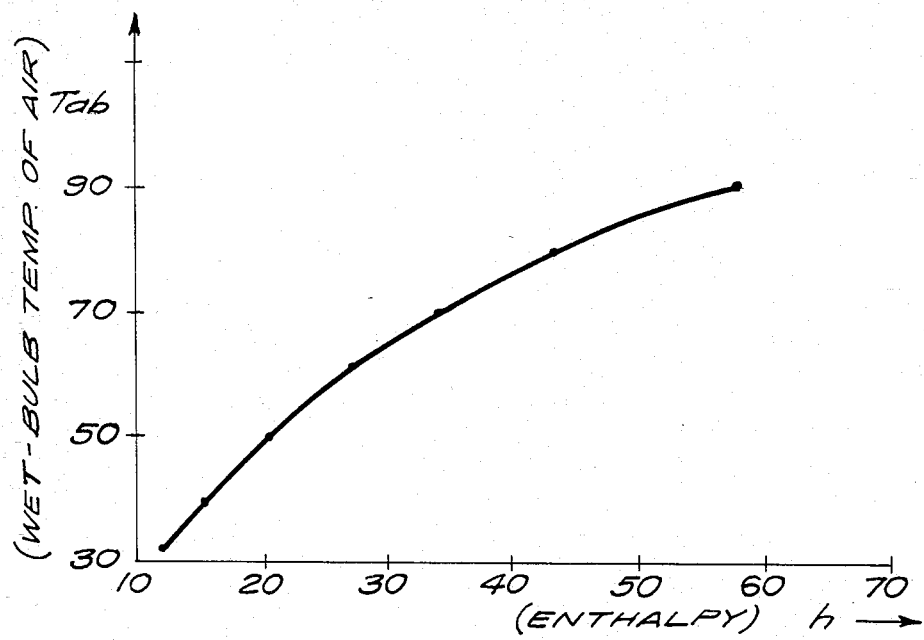

In the logic circuit 30 illustrated in FIG. 3, function generators 31 and 32 generate functions of temperature and enthalpy or energy content illustrated in FIGS. 7 and 8, respectively.

The operation of FIG. 3 is explained in greater detail in co-pending U.S. patent application Ser. No. 462,599, U.S. Pat. No. 4,474,027 filed Jan. 31st, 1983 and titled OPTIMUM CONTROL OF COOLING TOWER WATER TEMPERATURE BY FUNCTION BLOCKS.

Function block 31 is connected to the surrounding air temperature transmitter TT3 and generates a value Ps corresponding to the evaporation pressure of water at the surrounding temperature T. Multipliers 33 are utilized in conjunction with the relative humidity transmitter RH1 and the function block 31 to obtain a value corresponding to the partial pressure of moisture. A multiplier 34 and a difference unit or comparator 35 are then utilized to provide values to a division unit 36 which generates a value w which represents the moisture ratio of the outside air, i.e. the pounds of moisture per pound of dry air.

The outside temperature T and the moisture ratio w are supplied to a second portion of the logic module 30 at 39, and are used in conjunction with multipliers 37 and summing units 38 as well as the function generator 32 to generate the wet bulb air temperature $T_{ab}$.

While a specific embodiment of the invention has been shown and described in detail to illustrate the application of the principles of the invention, it will be understood that the invention may be embodied otherwise without departing from such principles.

What is claimed is:

1. A cooling tower monitor for determining the performance of a cooling tower having a hot water inlet, a cold water outlet and airflow means for producing an air flow through the tower, comprising:
   wet bulb temperature means for determining the wet bulb temperature of air outside the tower;
   available water flow means connected to said wet bulb temperature means for calculating available flow of water from the tower as a function of a rating factor and tower unit at standard conditions as well as cold water outlet temperature, hot water inlet temperature and air flow through the tower;
   a first temperature transmitter connected to said available water flow means for supplying a signal corresponding to the cold water outlet temperature;
   a second temperature transmitter connected to said available water flow means for supplying a hot water inlet temperature;
   an air flow transmitter connected to said available water flow means for supplying an air flow value;
   a water flow transmitter for generating a signal corresponding to an actual flow of water out of the tower; and
   a performance value generator connected to said available water flow means and said water flow transmitter for calculating a performance value of the cooling tower as a function of the available and actual water flow out of the tower.

2. A cooling tower monitor according to claim 1, wherein said wet bulb temperature means comprises a third transmitter for generating a signal corresponding to a temperature outside the tower, a relative humidity transmitter for generating a signal corresponding to the relative humidity outside the tower and a calculating module connected to said third temperature and said relative humidity transmitter for calculating the wet bulb temperature of air outside the tower.

3. A cooling tower monitor according to claim 1, wherein the cooling tower has an approach value and a range value as well as the standard condition tower unit and rating factor, said available water flow means comprising a first function generator connected to said first temperature transmitter and said wet bulb temperature means for calculating the actual approach of the tower as a difference between the wet bulb temperature and the cold water outlet temperature of the tower, a second function generator connected to said first and second temperature transmitters for generating an actual range of the tower as a function of the difference between the output and input water temperatures of the tower, a third function generator connected to said air flow transmitter for generating a function of the air flow, a fourth function generator connected to said wet bulb temperature means for generating a function of the wet bulb temperature, a first multiplier connected to said first and fourth function generators for multiplying the outputs thereof, a second multiplier connected to said second and third function generators for multiplying the outputs thereof, a third function generator connected to said first and second function generators for multiplying the outputs thereof, a fourth multiplier connected to said third multiplier for multiplying the output of said third multiplier by the standard condition rating factor of the cooling tower, and a dividing unit connected to said fourth multiplier for dividing the standard condition tower unit of the tower by the output of said fourth multiplier to generate the available water flow from the cooling tower.

4. A cooling tower according to claim 3, wherein said performance value generator comprises a further division unit connected to said first-mentioned division unit and to said water flow transmitter for dividing the actual water flow by the available water flow to generate the performance value.

* * * * *